United States Patent
Matson et al.

(10) Patent No.: US 6,777,011 B2
(45) Date of Patent: Aug. 17, 2004

(54) MULTI-LAYER FOOD PRODUCT, SYSTEM AND PROCESS

(75) Inventors: Kenneth E. Matson, Parkville, MO (US); Rick A. Bontrager, Tonganoxie, KS (US)

(73) Assignee: Crosswind Industries, Inc., Kansas City, MO (US)

( * ) Notice: Subject to any disclaimer, the term of this patent is extended or adjusted under 35 U.S.C. 154(b) by 205 days.

(21) Appl. No.: 09/894,537

(22) Filed: Jun. 28, 2001

(65) Prior Publication Data

US 2003/0003193 A1 Jan. 2, 2003

(51) Int. Cl.$^7$ ................................................ A23P 1/12
(52) U.S. Cl. ........................ 426/249; 426/89; 426/274; 426/275; 426/516
(58) Field of Search ................ 426/89, 104, 274, 426/275, 516, 249, 660

(56) References Cited

U.S. PATENT DOCUMENTS

| 4,832,970 A | * | 5/1989 | Mally et al. ................ 426/274 |
| 5,437,879 A | * | 8/1995 | Kabse et al. .................... 426/5 |
| 6,506,401 B1 | * | 1/2003 | Rothamel et al. ........... 426/439 |

* cited by examiner

Primary Examiner—Lien Tran
(74) Attorney, Agent, or Firm—Mark F. Brown (57) ABSTRACT

A system produces a multi-layer product by forming as many different ingredients as is required for the final product in steps that can be separate from each other and then combining these ingredients in an extrusion die that is formed to flow the separate ingredients in side-by-side flow paths and then combine them where necessary for the final product to be formed. Specifically, two of the flow paths are sandwiched by a third flow path whereby the final product is in the form of a sandwich with two ingredients in layers between two separate layers of a third ingredient. A specific example of the food product is an animal food treat in the form of a cheeseburger.

1 Claim, 9 Drawing Sheets

MULTI-LAYER FOOD PRODUCT, SYSTEM AND PROCESS

BACKGROUND OF THE INVENTION

There is an immense variety of prepared food products on the market. These food products are often prepared in a batch process, and some products are prepared using extrusion techniques. The food art contains an enormous amount of disclosures pertaining to the preparation of such prepared food products.

Due to the intense competition in the prepared food market, any advantage that can be obtained in the preparation of the product can be extremely valuable. These advantages are often manifested in improvements in efficiency as well as improvement in the quality and taste of the product itself. However, improvements in versatility for the systems and elements used in the production of the food product can also be important. Of course, the advantages are most striking if a design change improves all of the above-mentioned elements.

Multilayer prepared food products have been popular in recent times. These products are often two layers and are often formed by fairly complicated processes. Such products have often been expensive to produce and the processes are generally not amenable to easy modification so the product is not easily changed to accommodate market dynamics.

Therefore, there is a need for a process and system that can efficiently produce a multilayer prepared food product. Still further, there is a need for such a process and system that is amenable to efficient change.

More specifically, the production of a multi-layer prepared food product having two layers has often been complicated and expensive resulting in an expensive product. To the inventor's knowledge, there is no multi-layer prepared food product having more than two layers that can be efficiently produced in a cost-effective and versatile manner. Therefore, there is a need for a process and system for efficiently producing a multi-layer prepared food product that has more than two layers.

Most specifically, to the knowledge of the inventor, no multi-layer prepared food product on the market at the present time simulates a cheeseburger. That is, a food product that has a layer of cheese and a layer of meat sandwiched between two layers of bread. Because of the popularity of cheeseburgers, it is believed that the market for a prepared food product that simulates a cheeseburger will be quite large.

Therefore, there is a need for a process and system for producing a prepared food product that simulates a cheeseburger.

The market for animal-consumable food is nearly as large as the market for human-consumable food. The animal food market has numerous forms of pet treats including treats that simulate many food items that are produced for human consumption. However, to the inventor's knowledge, there is no prepared food product on the market that is intended for animal consumption that simulates a cheeseburger.

Therefore, there is a need for a prepared food product that is intended for animal consumption that simulates a cheeseburger.

SUMMARY OF THE INVENTION

The above-discussed disadvantages and drawbacks are overcome by a system that produces a multi-layer product by forming as many different ingredients as is required for the final product in steps that can be separate from each other and then combining these ingredients in an extrusion die that is formed to flow the separate ingredients in side-by-side flow paths and then combine them where necessary for the final product to be formed. The multi-layer product can thus include more than two layers. Specifically, two of the flow paths are sandwiched by a third flow whereby the final product is in the form of a sandwich with two ingredients in layers between two separate layers of a third ingredient for a total of four layers.

The overall system is quite versatile because as many ingredients and additives can be added to the die as desired and the die can have multiple flow paths defined therethrough whereby the ingredients are added together in layer form and the layers can be treated as necessary before further layers or further process steps are performed. The final product can be cut into lengths as desired so the final product takes a desired form. Modifying the final overall product is also cost effective because adding or deleting ingredients is efficient to achieve. The amount or type of additives can be easily changed as necessary so the desired overall final product is achieved in a cost effective and efficient manner.

A specific example of the food product is an animal food treat that resembles a hamburger, specifically, a cheeseburger. However, while this is the best mode for this invention, those skilled in the art will understand that the teaching of the present disclosure can be applied to any food product, including a food product for human consumption without departing from the scope of this disclosure. Accordingly, it is intended that such other food products are also to be included in the scope of the present invention.

TECHNICAL FIELD OF THE INVENTION

The present invention relates to the general art of food and edible materials, processes, compositions and products, and to the particular field of preparing or treating compositions involving combining diverse food materials.

OBJECTS AND ADVANTAGES OF THE INVENTION

It is a main object of the present invention to provide a multi-layer food product.

It is another object of the present invention to provide a multi-layer food product that is easily formed into a sandwich form.

It is another object of the present invention to provide a multi-layer food product having more than two layers.

It is another object of the present invention to provide a multi-layer food product that is cost-effective to produce.

It is another object of the present invention to provide a multi-layer food product that is formed by a versatile system that is amenable to changes in food product form and/or food product content.

It is another object of the present invention to provide a multi-layer food product that is formed by a process that includes an extrusion step.

It is a specific object of the present invention to provide a multi-layer animal food product.

It is another object of the present invention to provide a prepared food product that simulates a cheeseburger.

It is another object of the present invention to provide a prepared food product that is intended for animal consumption and simulates a cheeseburger.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The present disclosure provides a system and a process for producing a multi-layer food product that includes at least two layers of one ingredient sandwiching at least one layer of another ingredient to form a final product that is multi-layer and in the form of a sandwich food product. The various ingredients can be formed in separate process steps and then are combined in an extrusion die in layers that are combined into the multi-layer product having distinct layers. The final product is formed by performing steps, such as cutting lengths of the final multi-layer product into predetermined lengths of product, cooking as needed, and the like.

Figure 1:
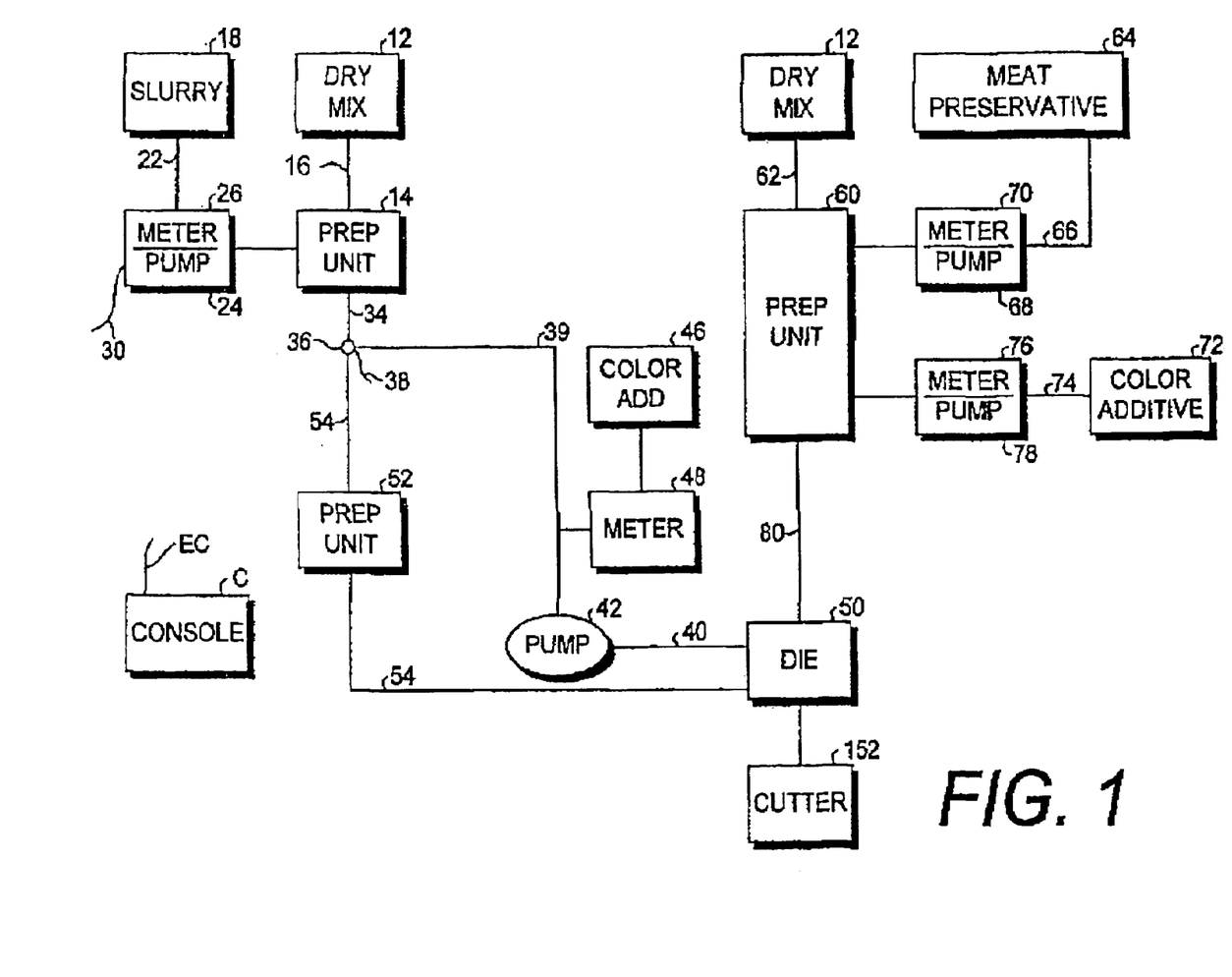
FIG. 1 is a schematic diagram showing the overall system for preparing a multi-layer food product according to the teaching of the present invention.

Specifically, referring to FIG. 1, a system 10 is shown for forming a multi-layer food product in accordance with the present invention. System 10 includes a supply 12 of dry mix material which is commonly us in forming food-like products. Some of these products include grain, palatability enhancers or the like, and those skilled in the art will understand what type of material is included in the dry mix to produce the final product discussed in this disclosure. Supply 12 can be in a single container or in several separate containers as necessary. The container can include mixing elements as well appropriate heating or cooling elements. Dry mix from supply 12 is moved to a plurality of different process steps. As shown in FIG. 1, dry mix from supply 12 is moved to a first preparation unit 14 which can be a cooker, including a batch cooker or a product densification unit (PDU) via a conduit 16 which fluidically connects unit 14 to supply 12. A slurry from slurry container 18 is formed using liquid or the like and is fluidically connected to unit 14 by a conduit 22, A pump 24 and a meter 26 are located in conduit 22 to move slurry from container 18 to unit 14. The pump and meter can be connected to a suitable control console C via electrical connections, such as connection 30 and/or connection EC to control movement of slurry to unit 14 in accordance with formulas associated with the final product being formed using system 10. The slurry is combined with the dry product in unit 14 and is prepared and formed into a slurry type material that is capable of flowing. A suitable pump, such as pump 32 is controlled at console C and is used to move dry mix to the various locations in system 10.

A conduit 34 conducts the slurry type material from unit 14 to a valve 36 that can be controlled by the control console via a suitable electrical connections, such as electrical connection 38 to divert some or all of the slurry type material into conduit 39. Another pump 42 is located in conduit 39 to move the slurry type material through conduit 39. As shown in FIG. 1, an additive, such as a food color, or taste enhancers, or food product, or the like, is added to the slurry type material flowing through conduit 39 from a container 46 via a meter 48 that can also be controlled from the system control console mentioned above. Pump 42 moves the slurry type material having the additive therein to a die 50 via a conduit 40. Die 50 is an extrusion die in which cooking is done and which is sized and configured to form the multi-layer product of the present invention from the ingredients flowing thereto as will be understood from the ensuing discussion.

As is also shown in FIG. 1, system 10 also includes a second preparation unit 52 which can be a former or cooker if desired. Unit 52 is fluidically connected to unit 14 via valve 36 and a conduit 54 and receives prepared slurry from unit 14 via that fluid connection. Unit 52 forms the received material into an appropriate slurry that flows to die 50 via conduit 54. A pump can be included in conduit 54 if necessary. It is also noted that appropriate pumps, meters and valves can be included at various locations throughout system 10 as needed, and can be controlled from console C.

It is noted that unit 52 can be omitted from some forms of system 10. In such an embodiment, slurry material from unit 14 will be routed directly to die 50 via conduit 34 and valve 36 which will be fluidically connected to conduit 54.

As is also shown in FIG. 1, system 10 further includes another preparation unit 60 fluidically connected to dry mix supply 12 by a conduit 62. Unit 60 can be a cooker, a batch cooker, a PDU or the like as required. A pump and/or a meter can be inserted in conduit 62 as necessary to move material from dry mix supply 12 to unit 60. System 10 includes an additive container 64 fluidically connected to unit 60 by a conduit 66 in which a pump 68 and/or a meter 70 is located. In the preferred form of system 10, additive from container 64 is a meat and preservative mixture and will be referred to as a meat like product. Some preservatives include animal fat, while others include gelatinized starches or the like.

Those skilled in the art will understand the ingredients of such a product based on the teaching of the present disclosure. As is also shown in FIG. 1, further additives, such as food coloring, taste enhancers, or the like can be added to the material being processed in unit 60 from a container 72 via a conduit 74 in which a meter 76 and a pump 78 are located to move the material from container 72 to unit 60 in volumes and at flow rates set at the control console C to correspond to the formula being followed to prepare the food product.

Once the material in unit 60 has achieved the desired condition, it flows from unit 60 to die 50 via a conduit 80. It is noted that unit 60, like units 14 and 52 as well as any other units that are included in the system, include appropriate sensors, meters and the like which are electrically connected to console C to relay information to that console. The relayed information is used at the console to control the overall process in accordance with the formulas and relationships being used to prepare the final product as well as the characteristics of the final product.

As will be understood from the present disclosure, all materials flowing to die 50 will be in a form that can flow through conduits to die 50.

In the preferred form of system 10, the final food product is in the form of a cheeseburger sandwich. For purposes of this disclosure, a "cheeseburger" is a sandwich-like product having a layer of cheese-like product on a layer of meat-like product with two layers of bread-like product sandwiching the layers of cheese-like product and meat-like product. It is also noted that any of the products used in the cheeseburger can be constituted in a manner that satisfies FDA definitions whereby the product can be termed "cheese," "meat" or "bread" under FDA definitions of such terms. Therefore, the term "cheeseburger, is intended to include such products as well. The terms that include "like" are intended to be applied to products and ingredients that are used in preparing products that can be sold with products such as those used for animal consumption or which can be sold for human consumption of such "like" products. Therefore, material from unit 14 is turned into a cheese-like product and has a food coloring such as yellow or orange added from container 46 so the product entering die 50 via conduit 40 has the appearance and taste of a cheese-like product. Still further, product from unit 52 will resemble bread or a bun when it is added to die 50 via conduit 54. Therefore, unit 52 will operate on material in conduit 54 as needed to turn the prepared dry mix slurry from unit 14 into a bread-like product. If no such unit is needed and the material from unit 14 can be used as a bread-like product in die 50, unit 52 can be omitted from system 10. Still further, when a cheeseburger-like product is being formed using system 10, dry mix from source 12 will be processed in unit 60 with meat-like products as well as preservatives and fat from container 64 and coloring and/or flavoring from container 72 to form a meat-like product to be added to die 50 via conduit 80.

As will be understood from the following discussion, these products are combined in die 50 to form a multi-layered product that has at least two layers of the same material sandwiching at least one layer, and preferably two layers, of other materials when the final product exits die 50.

Figure 2:
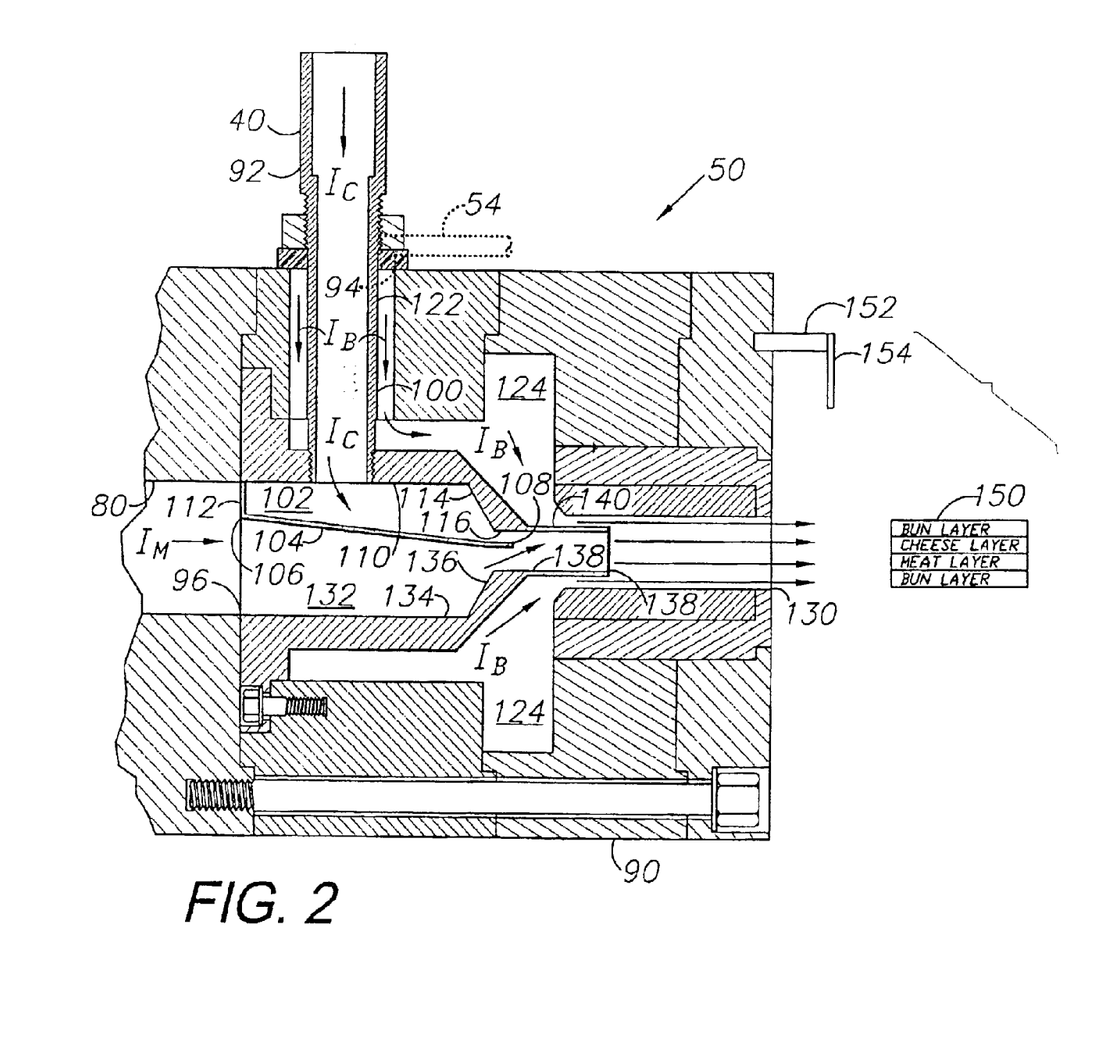
FIG. 2 shows a die used to combine steams of ingredients into a multi-layer food product according to the teaching of the present invention.

Die 50 is shown in FIG. 2. Die 50 is fluidically connected to conduits 40, 54 and 80 to receive materials $I_C$, $I_B$ and $I_M$ respectively therefrom. Accordingly, die 50 includes a body 90 which includes an inlet port 92 which receives conduit 40, an inlet port 94 which receives conduit 54 and an inlet port 96 which receives conduit 80 to establish fluid connections between those conduits and die body 90. It is noted that inlet port 94 and conduit 54 are shown in FIG. 2 by dotted lines to indicate that they are hidden in FIG. 2. As can also be understood from FIG. 2, body 90 includes a flow path 100 defined therethrough and which intersects a chamber 102 defined by body 90 and a separator plate 104. Separator plate 104 is fixed at one end 106 thereof to body 90 and has another end 108 spaced from end 106. Chamber 102 is defined by separator plate 104, wall 110, rear wall 112 and front wall 114 and extends from adjacent to end 106 of separator plate 104 to adjacent to end 108 of separator plate 104. An outlet 116 of chamber 102 is located adjacent to end 108 of the separator plate. Material $I_C$ flows from conduit 40 into chamber 102 via flow path 100 and from chamber 102 via outlet 110 as indicated by the arrow in FIG. 2.

As is also shown in FIG. 2, a flow path 122 is defined in body 90 to extend from inlet 94 to a chamber 124 that surrounds chamber 102 adjacent to outlet 116. Because of this relative positioning of chambers 102 and 124, any material $I_B$ flowing in conduit 54 will surround material $I_C$ flowing from conduit 40 through and from chamber 102. The consistency of the materials is maintained so these materials will not mix together, but only abut each other and bond at the abutting surfaces when they are combined in die 50. While these materials are flowing in chambers 102 and 124 they are flowing essentially side-by-side and in a common output direction toward outlet port 130 of die 50.

As is shown in FIG. 2, material $I_M$ flowing from conduit 80 flows through inlet port 96 into a chamber 132 and flows in the output flow direction toward outlet port 130 as indicated in FIG. 2. Chamber 132 is defined by separator place 104, wall 134 and front wall 136. An outlet 138 is definded by front wall 136 and end 108 of separator plate 104. Chamber 124 surrounds chamber 132 adjacent to outlet 138 whereby any material $I_M$ flowing from conduit 80 through chamber 132 and out outlet 138 will be surrounded by material flowing through camber 124. As discussed above, the material $I_M$ and $I_B$ are formed so that they can flow in the side-by-side manner indicated in FIG. 2 the output direction and can abut each other in layers without intermingling whereby layers are formed and retained as the mixture moves toward and through outlet port 130. The layers of the materials is indicated in FIG. 2 as layers $L_B$, $L_C$, and $L_M$, with two layers $L_B$ sandwiching layers $L_C$ and $L_M$.

An exit conduit 140 extends from outlets 116 and 138 of chambers 102 and 132 respectively into outlet flow path 142 through die 50 to ensure that materials $I_M$ and $I_C$ form distinct layers that are in abutting contact before layer $I_B$ contacts such abutting layers. Further distances and heat addition are included in die 50 to ensure that the multi-layer product shown in FIG. 2 exiting outlet port 130 contains distinct layers. The length and internal dimensions of exit conduit 140 are adjusted so the layers $L_C$ and $L_M$ bond together yet are sufficiently unfinished to accept layer $L_B$. In one form of the die, this distance is 0.50 inches, while the conduit is circular and has an internal diameter of 0.314 inches. The conduits and chambers are sized to produce pressures that achieve the goals of the process, such as a pressure of 400 to 500 psi in chamber 124. However, such pressures and temperatures can be adjusted to accommodate the final product. These state conditions can be monitored at the control console and adjusted as necessary according to feedback from an analysis of the final product being produced by the system.

Die 50 preferably is an extrusion die, so the final multi-layer product 150 is a continuous stream of product. In some instances, it is desirable to have finite lengths of material.

Figure 3:
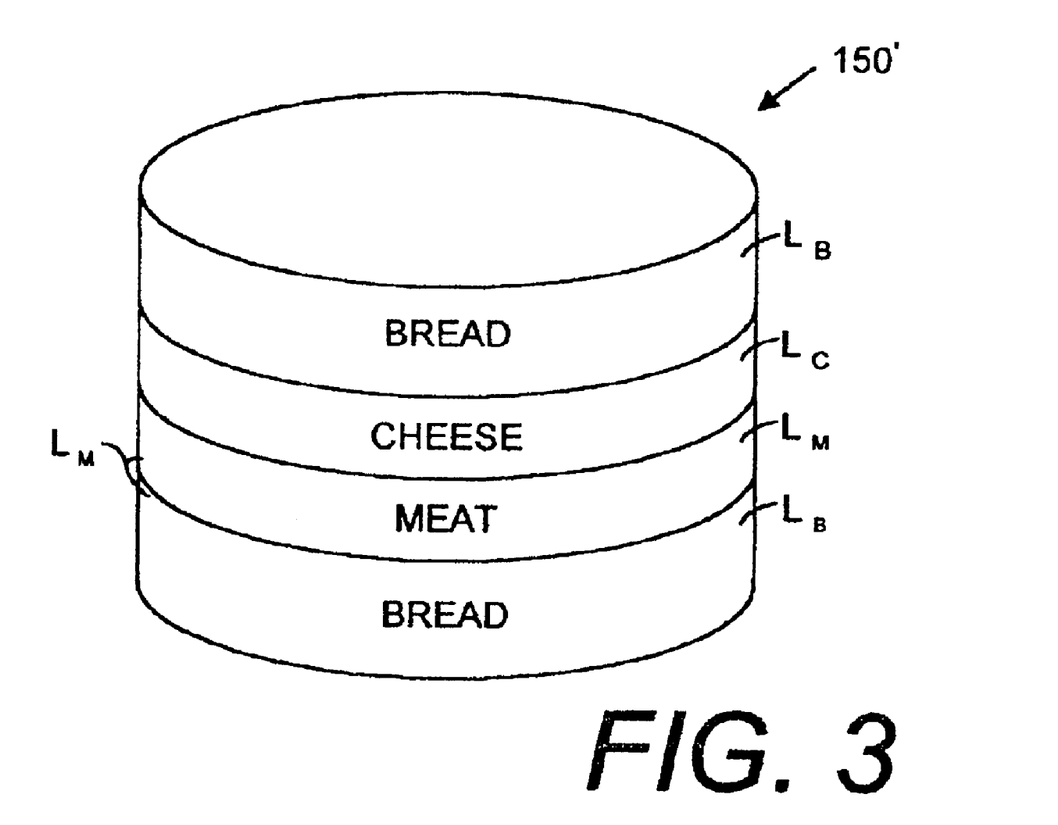
FIG. 3 is a multi-layer food product formed in accordance with the teaching of the present invention.

Accordingly, a cutter unit 152 is mounted on die 50 adjacent to outlet port 130. Cutter unit 152 includes a knife blade 154 and is controlled by the control console for the system to cut predetermined lengths of multi-layer product flowing from outlet port 130. The materials forming the various layers can have different contraction rates during cooling whereby a rectangular element with co-extensive ends for the layers such as shown in FIG. 2 will distort and assume an arcuate peripheral shape with layers $L_B$ in some cases shrinking more than layers $L_C$ and $L_M$ which shrink about the same as each other whereby, layers $L_C$ and $L_M$ will extend out of layers $L_B$ in the manner of a sandwich such as a cheeseburger. A product of this shape is indicated in FIG. 3 as product 150' with an overlap being indicated by portion $L_M'$. However, depending on the materials used in the layers, the distortion and shrinkage may vary or be the same for all layers. Those skilled in the food art will understand the factors and the effects of the various factors on the final product based on the teaching of this disclosure.

Figure 2A:
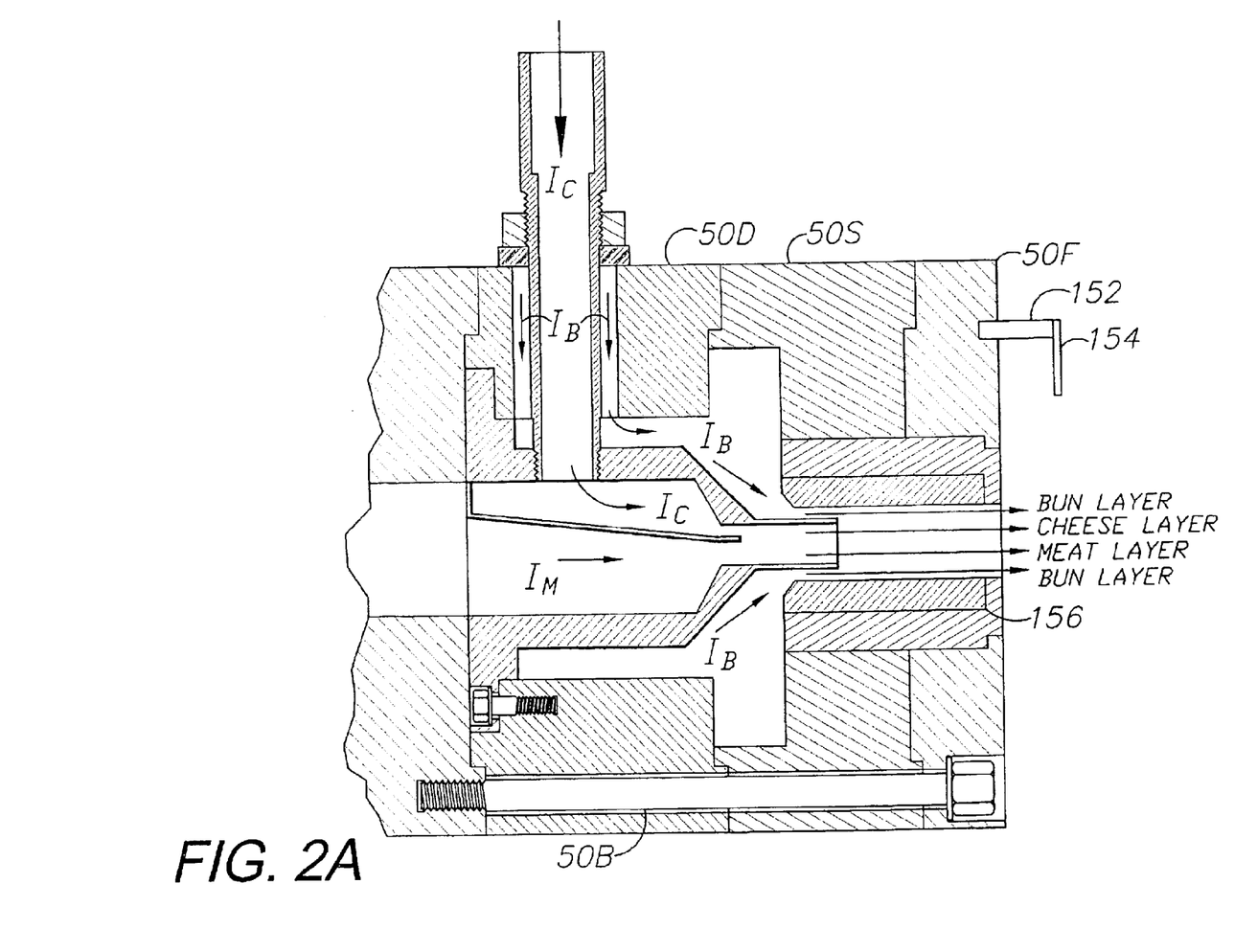
FIG. 2A is a machine drawing of a die used in the system of the present invention.

For the sake of completeness, a machine drawing of die 50 is shown in FIG. 2A. As shown in FIG. 2A, an insert element 156 is located in flow path 142 and has properties that permit the heat transfer between the food layers to be adjusted to attain the goal of a plurality of distinct layers. As can be seen in FIG. 2A, die 50 can be assembled and disassembled according to the requirements of the final product. For example, a spacer block 50S separates die portion 50D from die final portion 50F. By selecting the size of spacer block 50S the distance between die portion 50D and final portion 50F can be adjusted. By adjusting this distance, the final cooking of the product can be controlled. Furthermore, by selecting the material for insert element 152 the cooking process can also be controlled. The material for insert element 152 is delron which contributes to the preparation of the final product. The thickness of the various layers can also be adjusted by adjusting the parts of die 50 as well. A bolt 50B is used to hold the parts of die 50 together.

Figure 4:
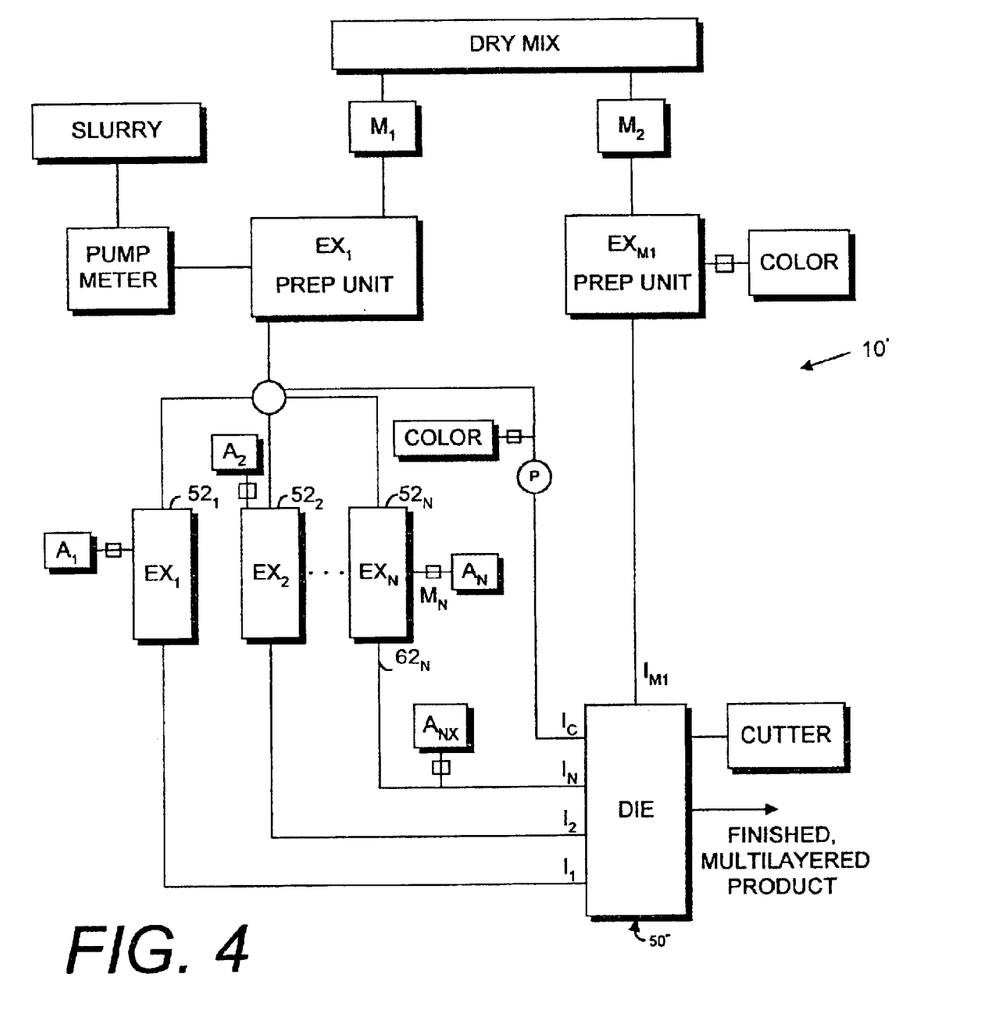
FIG. 4 is a schematic diagram showing another form of the overall system for preparing a multi-layer food product according to the teaching of the present invention.
Figure 5:
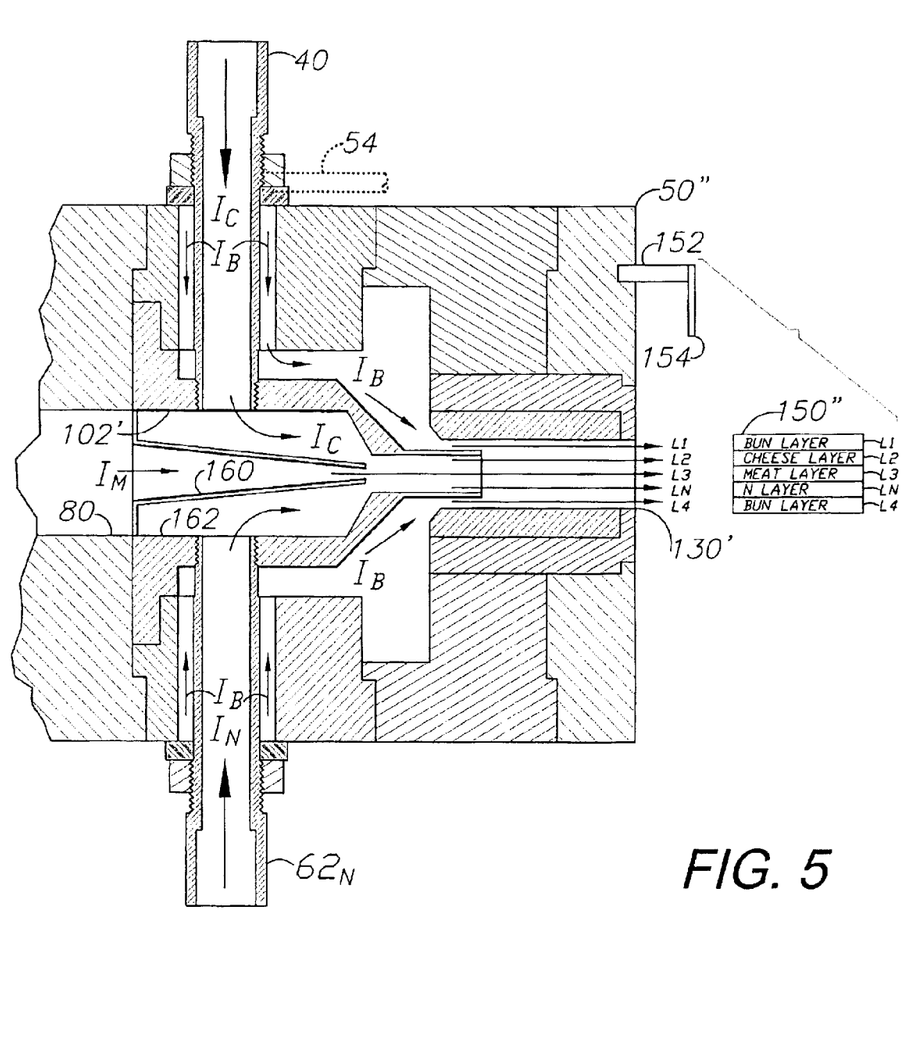
FIG. 5 shows another die used to combine steams streams of ingredients into a multi-layer food product according to the teaching of the present invention.

As mentioned above, the final product can contain a multiplicity of layers. While four layers have been disclosed above, more than four layers can be formed. To indicate this situation, FIG. 4 shows system 10' that has a plurality of units $52_1, 52_2 \ldots 52_N$ and a plurality of additive units $A_1 \ldots A_N$. Material streams $I_1 \ldots I_N$ flow into die 50" such as shown in FIG. 5, with the dots indicating further elements that are not specifically shown but which can be included. As shown in FIG. 5, die 50" includes a plurality of flow paths that are arranged so that one of the flow paths surrounds the others to sandwich the other flow paths therein in the manner discussed above for layer $L_B$. As discussed above, because the die is easily assembled and disassembled, the re-configuration of the die to accommodate further material flows is efficiently achieved. Thus, as shown in FIG. 5, a second separator plate 160 is included in die 50" and a conduit $62_N$ from unit $52_N$ fluidically connects unit $52_N$ to die 50" and to a chamber 162 that is similar to chamber 102 of FIG. 2. Material $I_N$ flows into chamber 162 and then toward the outlet port 130' as discussed above in a side-by-side manner with material flowing in chamber 102' and chamber 124'. As discussed above in reference to die 50, these materials are combined in die 50" to form layers $L_1 \ldots L_N$ for product 150". A cutter unit 152 having a revolving cutter blade 154 can also be included in the die shown in FIG. 5.

Figure 6:
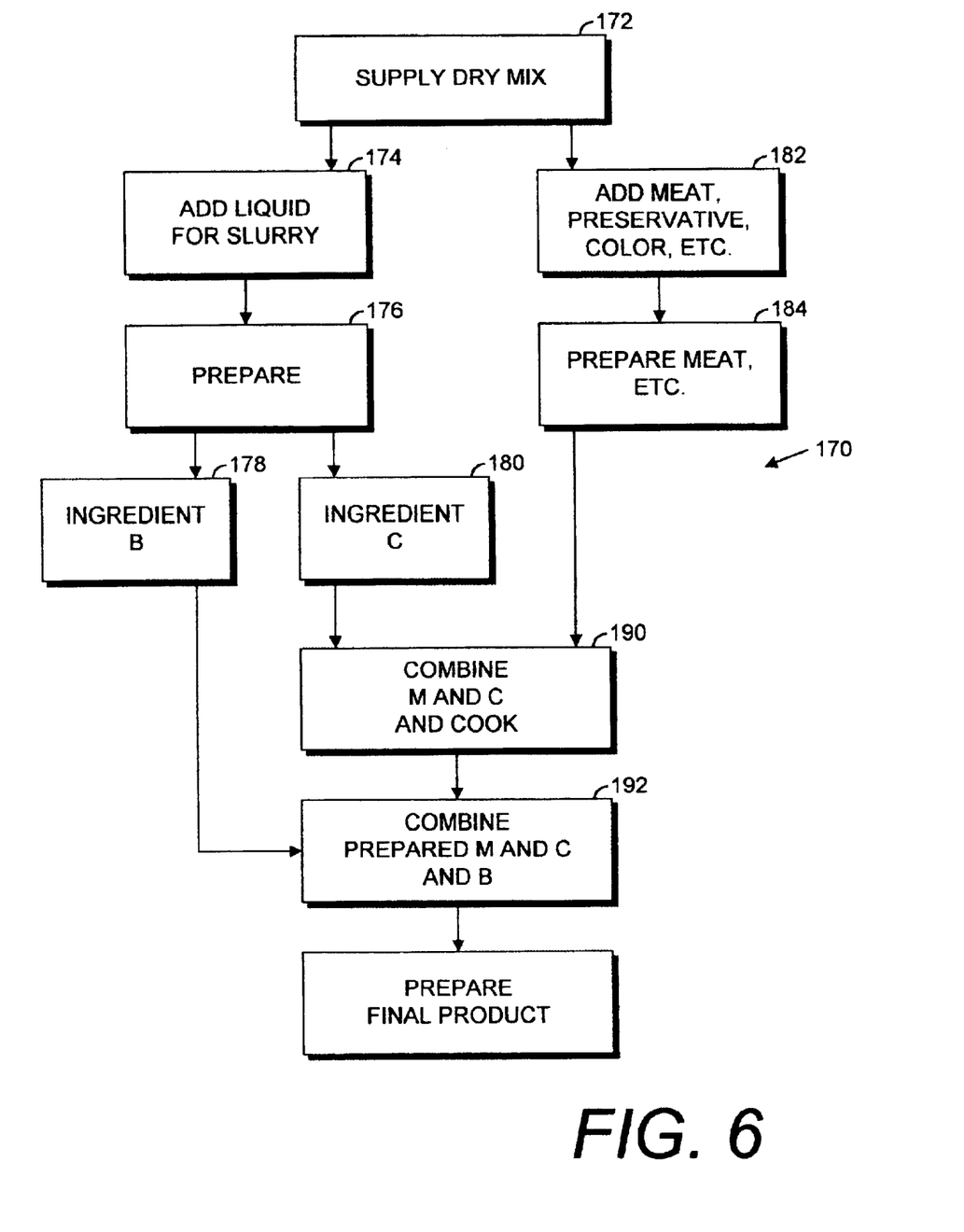
FIG. 6 is a flow diagram illustrating the process used to form a multi-layer food product according to the teaching of the present invention.
Figure 7:
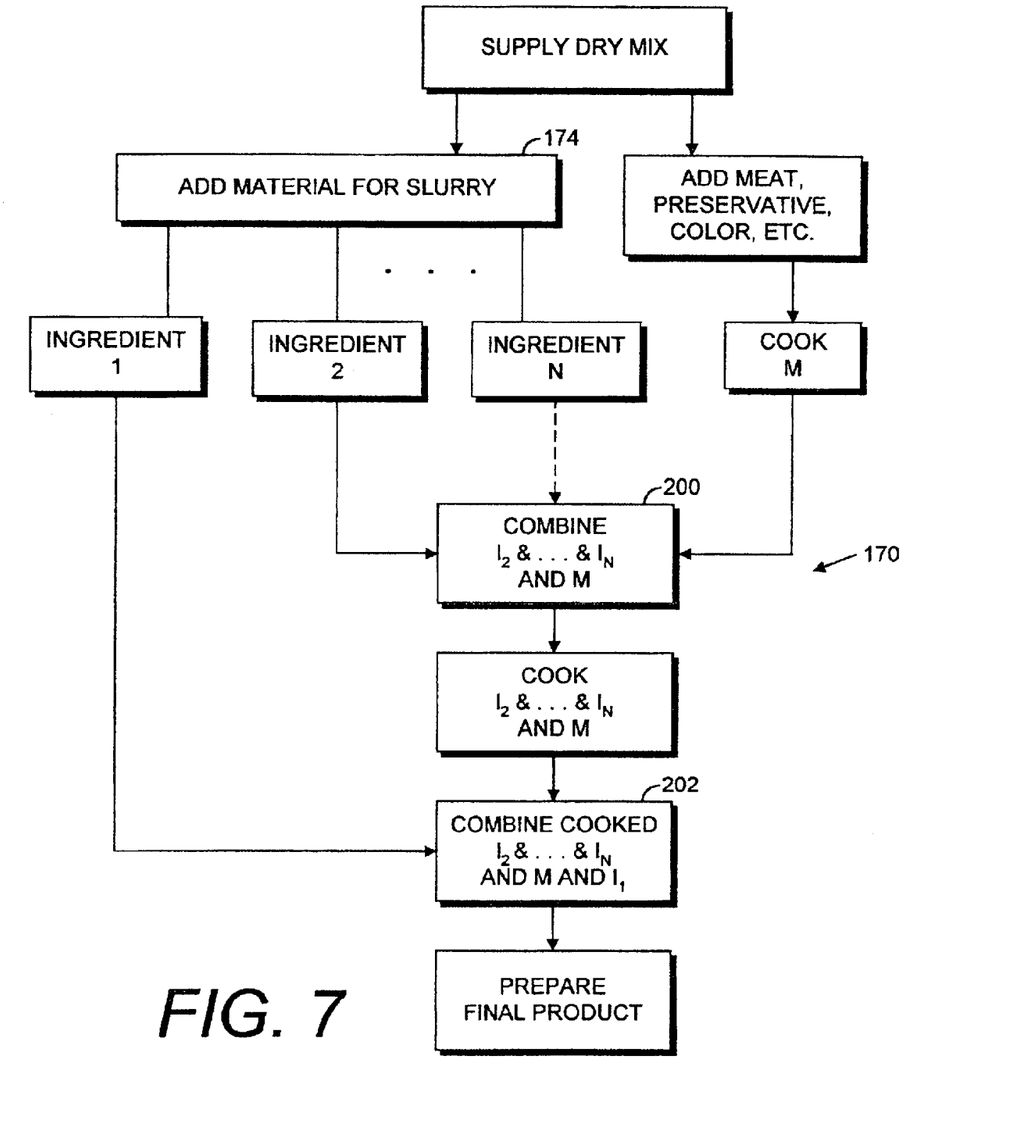
FIG. 7 is a flow diagram illustrating another process used to form a multi-layer food product according to the teaching of the present invention.

The overall process for forming the multi-layer product of the present invention is indicated in FIG. 6 for the preferred form of the multi-layer product and in FIG. 7 for a multi-layer product having more than four layers.

Thus, as shown in FIG. 6, the overall process 170 is shown as including steps of: providing a dry mix in step 172; combining the dry mix with a liquid to form a slurry in step 174; preparing, as by cooking, the slurry in step 176; adding a first additive to the prepared slurry to form a first ingredient in step 178; adding at least a second additive to the cooked slurry and forming a second ingredient in step 180; adding a third additive to the dry mix to form a third ingredient in step 182; preparing, as by cooking, the third ingredient in step 184; flowing the first ingredient and the third ingredient in side-by-side intersecting streams to form a first multi-layer product in step 190 and causing the first multi-layer product to flow in an output direction; and causing the second ingredient to flow in the output direction at two locations adjacent to the first direction; combining the flowing multi-layer product with the flowing second ingredient at the two locations to form a final multi-layer product in step 192. The final product can then be formed by cutting the material flowing out of the die and further treating that material as required for the end product. As indicated in FIG. 6A, the process shown in FIG. 6 can be modified to omit step 178 if unit 52 is omitted so that some prepared ingredient flows directly from step 176 to step 192.

This process is slightly modified in process 170' shown in FIG. 7 to accommodate any number of materials included in the final multi-layer product. Thus, as shown in FIG. 7, the just-described process is repeated, but additional materials indicated by the dots and the unit $I_N$ are added to the mix in the forming die at step 200, with the outer layers being added from unit $I_1$ in step 202. Process 170' uses system 10' and die 50" and produces product 150".

Figure 6A:
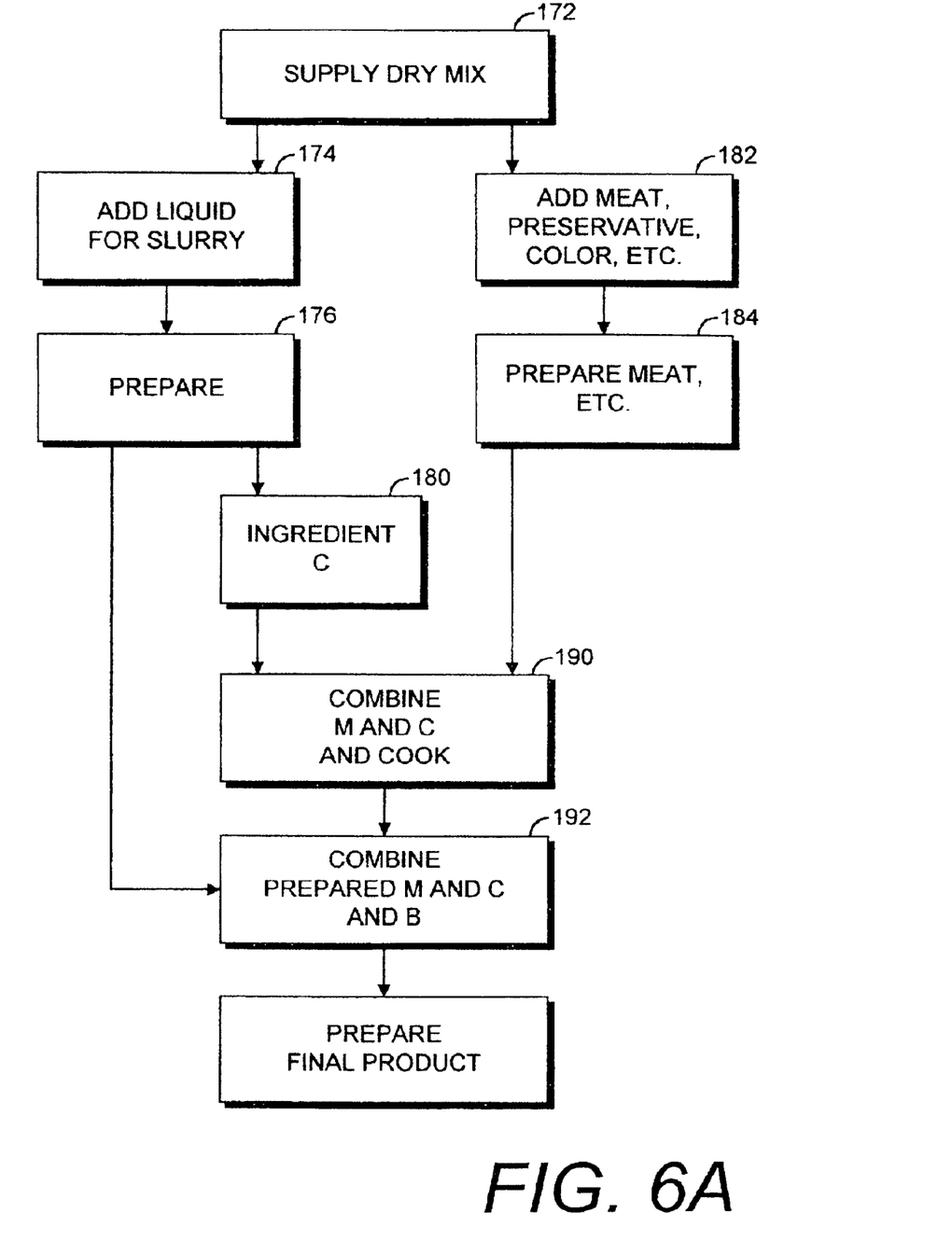
FIG. 6A is a flow diagram illustrating a modified form of the process shown in FIG. 6.

As was the case in FIG. 6A, some of the preparation units can be omitted with ingredients flowing directly from step 174 in FIG. 7 to step 202 without any processing performed on the ingredient between steps 174 and 202.

The preferred form of the multi-layer product as shown in FIG. 3 is formed using the following ingredients: wheat red second clear, soy flour, soy bean meal 47.5% pro, salt, glycerol monosterate, potassium chloride, potassium sorbate, corn syrup, propylene glycol, smoke charsol C-10, phosphoric acid, beef tallow, emulsified beef, caramel and $TiO_2$ and forms a product that is in the form of a cheeseburger and is suitable for animal treats. Real cheese can be used in the product if desired. The final product can include moisture that is sufficient to make the overall product contain 10%–11% moisture by weight for a dry product and 15% to 25% moisture by weight for a semi-moist product. It is also noted that the other ingredients that can be added in the alternative forms of the system shown in FIGS. 4, 5 and 7 include sesame seeds, egg-like products and the like.

It is to be understood that while certain forms of the present invention have been illustrated and described herein, it is not to be limited to the specific forms or arrangement of parts described and shown.

What is claimed is:

1. A continuous process for producing a multi-layer food product, which process comprises the steps of:

providing a dry mix material;

providing a liquid adapted for combining with said dry mix material;

combining a first quantity of said dry mix material and said liquid and thereby forming a slurry;

cooking the slurry in a first cooking unit;

providing a first slurry stream from said first cooking unit and adding a first additive thereto and thereby forming a first ingredient consisting of said slurry combined with said first additive;

providing a second slurry stream from said first cooking unit and adding a second additive thereto and thereby forming a second ingredient consisting of said slurry combined with said second additive;

combining a second quantity of said dry mix material with a meat additive to provide a meat ingredient;

flowing said meat ingredient in a meat ingredient stream;

providing a second cooking unit with a die including inputs for said first, second and meat ingredients and outputs for two streams of said first ingredient, a stream of said second ingredient and a stream of said meat ingredient;

flowing said first, second and meat ingredients into said respective die inputs in said die;

providing said die with a separator plate associated with said second and meat ingredient inputs;

cooking and splitting said first ingredient stream in said die into a pair of first ingredient output streams located on opposite sides of said second and meat ingredient streams;

outputting said second and meat ingredients through said separator plate in said die between said pair of first ingredient output streams;

combining said pair of first material output streams with said second and meat ingredient output streams in overlying relation in a multi-layered output;

providing a rotating knife on a downstream end of said second cooking unit die; and slicing said multi-layered output into respective, discrete, multi-layered product units with said rotating knife.

* * * * *